United States Patent [19]

Goeckner

[11] Patent Number: 5,253,570
[45] Date of Patent: Oct. 19, 1993

[54] BALER WITH LOAD SENSOR

[75] Inventor: Victor D. Goeckner, Virden, Ill.

[73] Assignee: Hay & Forage Industries, Hesston, Kans.

[21] Appl. No.: 859,235

[22] Filed: May 5, 1986

Related U.S. Application Data

[63] Continuation of Ser. No. 537,732, Sep. 30, 1983, abandoned.

[51] Int. Cl.⁵ .................... B30B 15/26; B30B 9/30
[52] U.S. Cl. ........................ 100/41; 100/43; 100/191
[58] Field of Search .................. 100/41, 43, 191; 364/550

[56] References Cited

U.S. PATENT DOCUMENTS

| | | | |
|---|---|---|---|
| 3,212,434 | 10/1965 | Raab | 100/192 |
| 3,700,865 | 10/1972 | Ley | 364/573 |
| 3,790,910 | 2/1974 | McCormack | 364/573 |
| 3,939,459 | 2/1976 | Hoopes | 364/573 |
| 4,149,120 | 4/1979 | Richter | 364/573 |
| 4,166,414 | 9/1979 | Fleming et al. | 100/43 |
| 4,280,403 | 7/1981 | Alderson | 100/43 |
| 4,282,578 | 8/1981 | Payne et al. | 364/573 |
| 4,349,886 | 9/1982 | Ibar | 364/573 |
| 4,395,711 | 7/1983 | Ward | 324/208 |
| 4,403,296 | 9/1983 | Prosky | 364/573 |
| 4,502,006 | 2/1985 | Goodwin et al. | 324/233 |

OTHER PUBLICATIONS

Hesston, "Big Bale System", Hesston Corporation, Hesston, Kansas, 1978.

*Primary Examiner*—Andrew M. Falik
*Attorney, Agent, or Firm*—Hovey, Williams, Timmons & Collins

[57] ABSTRACT

In a rectangular baler provided with a reciprocating plunger that compacts each new charge of crop materials against previously compacted material and incrementally advances the compacted charge toward a restricted discharge opening at the rear of the baler, the compressive load in the connecting rods of the plunger is sensed during each compaction stroke and is compared with a preselected value to determine whether the size of the discharge opening should be increased or decreased in order to maintain the selected load value. A sensor in each of the connecting rods is in the nature of a transducer that causes a change in the frequency of an output signal in accordance with the compressive loading in the connecting rod, such output signal being delivered to a controller which in turn regulates the operation of hydraulic mechanism to increase or decrease the size of the discharge opening.

20 Claims, 3 Drawing Sheets

BALER WITH LOAD SENSOR

This application is a continuation, of application Ser. No. 537,732, filed Sep. 30, 1983 abandoned.

As part of the disclosure not printed herewith, a computer program source code listing is available as a "Microfiche Appendix" having a total of 36 frames contained in a total of one microfiche.

BACKGROUND OF THE INVENTION

The present invention is directed to improvements in obtaining accurate measurements from sensors of the type utilizing relatively movable electromagnetic coils and ferromagnetic cores. More particulary, the present invention is directed to an improvement in such a sensor when used in measuring load forces applied to a structural member.

While the invention may find utility in a broad variety of applications, the disclosure will be facilitated by reference to the specific problem of monitoring the compressive force applied to a quantity of forage material or hay in a baling apparatus. The problem of accurately monitoring and controlling the compressive force applied during the baling of forage material or hay by such a baling machine has been heretofore accomplished only with relative difficulty and expense.

In such a baling machine, it is generally desirable to achieve relatively uniform density in the bales of forage material or hay produced. The bale density is in turn controlled by the amount of axial force applied to the bale by an axial compression member driven by one or more elongate tubular "plunger arms". The compression on this plunger arm is further grounded in accordance with the position of movable side wall members of the baling apparatus. These side wall members, together with fixed top and bottom walls, define what is generally referred to in the art as the baling chamber In accordance with prior art practice, various means were utilized to measure the compressive force applied in the axial direction by the plunger arms and to control the positions of the movable sidewalls accordingly so as to achieve relatively uniform bale density. See, for example, U.S. Pat. Nos. 4,148,254; 4,166,414 and 4,168,659 assigned to the assignee of the present invention. This practice allowed the system to "open up" the sidewalls, if necessary to prevent excessive load on the apparatus and consequent damage thereto. However, as previously noted, solutions heretofore proposed for the problem of measuring the axial compressive force or load have been relatively difficult and expensive to implement.

For example, presently available stress guages and related circuitry for obtaining accurate measurements of this compressive force or load are relatively complex and expensive. This is due in large part to the non-linear characteristics of the stresses or compressive forces experienced in the plunger arm member in response to various compressive forces applied thereto. In this regard, the plunger arm generally comprises a tubular rectilinear structural member which is utilized to drive a movable compression surface longitudinally of the compression chamber. In practice, the plunger may apply a compressive force of up to 100,000 pounds to the forage material. However, during this compression the plunger arm itself is in fact compressed only a very small amount, for example on the order of 0.01 inches.

It is generally known to measure relative positions or movements of this type by the use of a coil of wire into which a ferromagentic core extends. In the case of a plunger arm, both the coil and ferromagnetic core may be mounted to opposing end surfaces of the elongate tubular plunger arm. Accordingly, a change in flux density of the coil will take place as the ferromagentic core is moved relative thereto in response to the compression of the plunger arm.

The coil of wire is often coupled in an electronic circuit to form an oscillator, the frequency of which varies with the movement of the core inside of the coil of wire. However, it will be appreciated that with a compression of only on the order of 0.01 inches only relatively small changes in and flux density occur. Hence, a high degree of resolution in reading the corresponding changes in the electrical signals developed across the coil is required.

Additionally, due in part to the rectilinear structure of the tubular plunger arm, the relationship between the force applied thereto and the amount of axial compression is a non-linear one. Moreover, the relationship between movement of the core piece inside the coil of wire and frequency developed by the oscillator is also non-linear. Accordingly, each such sensor must be carefully calibrated with the particular plunger on which it is to be used. It will be appreciated that such individual calibration can become relatively cumbersome and expensive.

In accordance with the present invention, however, a novel and relatively inexpensive method and apparatus for achieving this individual calibration of sensors has been discovered. Moreover, as will be seen from the ensuing description of the invention, a number of other advantages and novel features are achieved by the apparatus and method of the invention.

OBJECTS AND SUMMARY OF THE INVENTION

Accordingly, it is a general object of the invention to provide a novel and improved position or movement sensor apparatus.

A more particular object is to provide a sensor apparatus in accordance with the foregoing object for accurately measuring the load applied to a structural member.

A still more particular object is to provide a sensor of the foregoing type for determining the axial load on a plunger arm of a forage baling machine.

A further object is to provide a sensor of the foregoing type which is capable of measuring the reduction in effective length of the plunger arm due to such axial compressive forces to a surprisingly high degree of resolution and accuracy in spite of the non-linear relationships between applied force, compression, and the response of the circuit.

An additional object is to provide a load sensor of the foregoing type which may be relatively simply and inexpensively calibrated for repeatable accuracy with a particular plunger arm at a minimum of labor and expense.

Briefly, and in accordance with the foregoing objects, the invention provides a method and apparatus for measuring a compressive load on a structural member. The method includes the steps of developing an oscillatory signal which varies in frequency in accordance with a compressive force applied to said structural member; linearizing the relationship of said oscillatory signal to said compressive force in accordance with a plurality of said oscillatory signals developed in response to a plurality of known compressive forces applied to said structural member; and calculating the compressive load on said structural member in accordance with said oscillatory signals developed and said linearizing of said response.

In accordance with another aspect of the invention, novel apparatus for measuring a compressive load on a structural member comprises signal generating means coupled with said structural member and responsive to a compressive force applied thereto for producing a frequency-variable signal at a frequency corresponding in a predetermined fashion to said compressive force; and measuring circuit means responsive to said frequency-variable signal for producing a load signal corresponding to the compressive load on said structural member; said measuring circuit means including linearizing circuit means responsive to a plurality of said frequency-variable signals produced in response to a corresponding plurality of known compressive forces applied to said structural member for producing a linearizing control signal, and calculating circuit means responsive to said frequency-variable signal and to said linearizing control signal for calculating said compressive load.

BRIEF DESCRIPTION OF THE DRAWINGS

The foregoing as well as other objects, features and advantages of the invention will become more readily apparent upon consideration of the following detailed description of the illustrated embodiment, together with reference to the drawings, wherein.

DETAILED DESCRIPTION OF THE ILLUSTRATED EMBODIMENT

Figure 1:
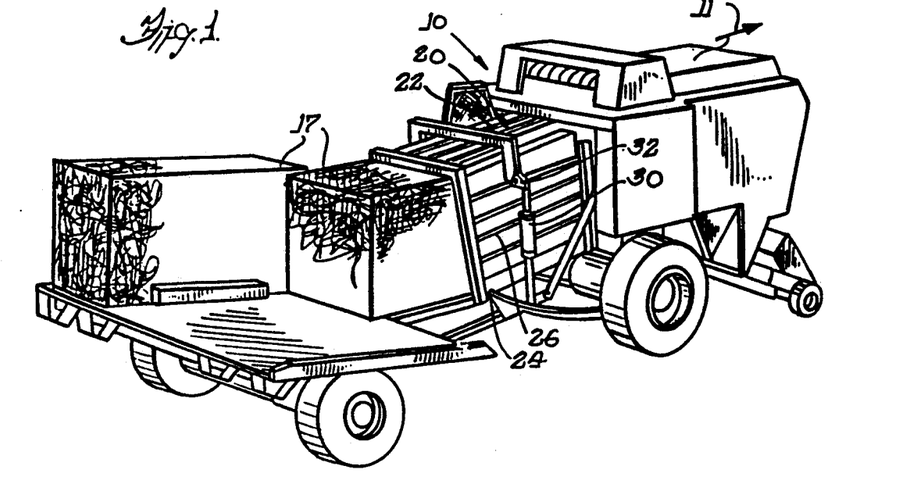
FIG. 1 is a rear perspective view of a baling machine or baler in conjunction with which the invention may advantageously be utilized.
Figure 2:
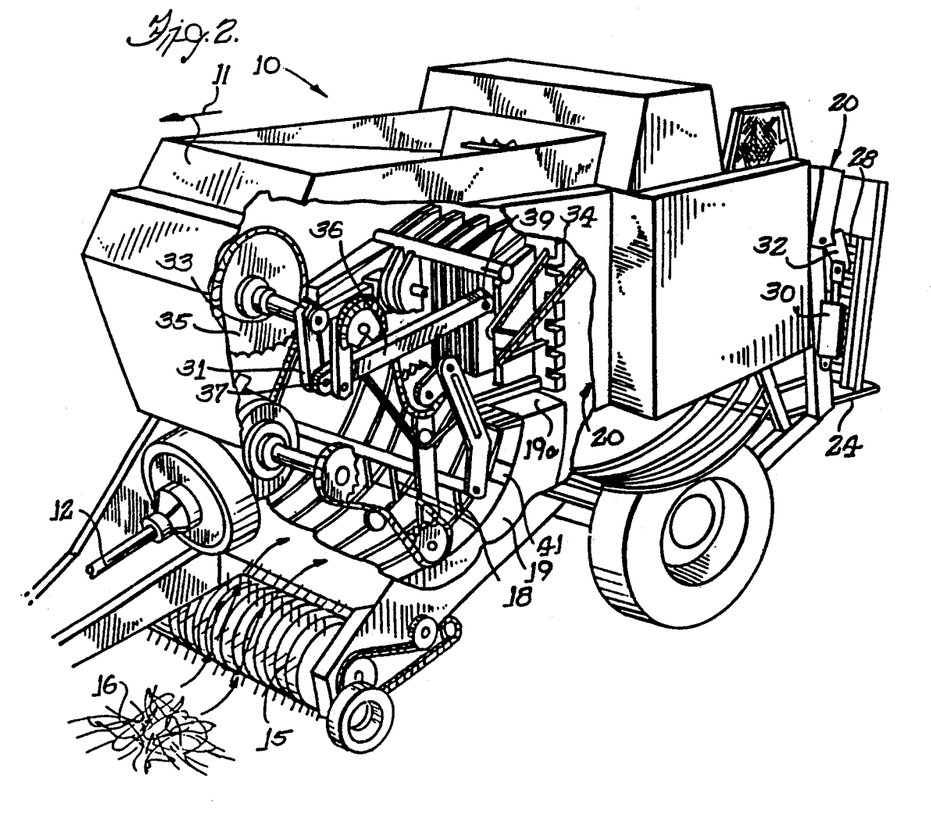
FIG. 2 is an enlarged front perspective view of the baler of FIG. 1 partially broken away and illustrating further details thereof.

Referring now to the drawings and initially to FIGS. 1 and 2 a baling machine or baler is designated generally by the reference numeral 10. Generally speaking, this baler 10 is pulled in a direction 11 by suitable means such as a tractor (not shown). A main drive shaft 12 is utilized to operate the baler 10 with power from the tractor power take-off (PTO).

In operation, the baler 10 includes a front or intake end or reel 15 which delivers forage material or hay 16 from the field to be further processed into bales 17 here shown exiting the rear of the baler 10. In this regard, the collected crop material is preferably formed in an intake chute 19 into generally uniform "charges" or "flakes" and delivered by movable fingers 18 to a bale chamber 20.

The bale chamber 20 comprises fixed top and bottom wall members 22, 24 and a pair of inwardly compressible opposed side wall members 26 and 28. Suitable means such as one or more hydraulic pistons 30 are coupled with suitable linkages 32 to effect relatively inward and outward movement of the side walls 26, 28 to control the width of the bale of hay 18. At the same time, generally axial or longitudinal compression of the hay in the chamber 20 is effected by an axial or longitudinally slidable compression wall or surface 34 which is axially or longitudinally driven by a pair of suitable plunger arms 36. Only one such plunger arm 36 is illustrated in FIG. 2 it being understood that both plunger arms are substantially identical.

In operation, the foregoing moving components of the baler 10 are linked by suitable chain drives or the like to be driven from the main power shaft 12. Accordingly, as the reel 15 rotates to take up the previously cut hay 16, and delivers it to the chute 19, the fingers 18 are arranged to periodically traverse the chute 19, to deliver the crop material as a "flake" or "charge" to the baling chamber 20. In this regard, FIG. 2 illustrates the plunger arm and axially movable compression surface 34 in a partially advanced position extending over the open end 19a of the chute 19. Accordingly, the fingers 18 are positioned toward the lower end of the chute 19 so as to be ready to deliver a succeeding charge to the bale chamber 20.

It will be noted that the plunger arm 36 is driven by a crank 31 which is in turn rotated by a shaft 33 affixed to a sprocket wheel 35. The plunger arm 36 is provided with bearings 37 and 39 at respective ends thereof to translate this rotary motion to axial motion of the compression wall or surface 34. Accordingly, a suitable sensor diagrammatically illustrated at 41 may be utilized to detect the advanced position of fingers 18 for delivering a charge of material to bale chamber 20. It will be understood that when the fingers 18 are advanced in this fashion, the compression surface 34 and plunger arm 36 will be fully withdrawn and hence in a non-compressed condition to allow ingress of the flake to the bale chamber 20. As will be seen later, the signal from this sensor 41 may be utilized as a suitable indication of the uncompressed condition of plunger arm 36 for zeroing the apparatus of the invention after each compression or load measurement.

In operation it is generally desirable to obtain a relatively uniform density in the bales 18 produced by the baling chamber 20. Accordingly, the prior art has heretofore utilized a suitable sensor arrangement to monitor or sense the amount of compressive force applied by the axial or longitudinal compression member or surface 34 and to then control the position of the side walls 26 and 28 by operating the pistons 30 so as to achieve substantially uniform density from one bale 18 to the next.

Figure 3:
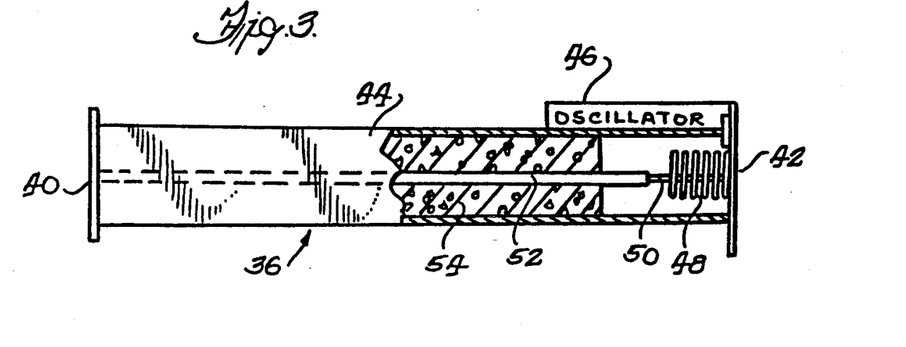
FIG. 3 is a side elevation, partially broken away illustrating a structural member or plunger arm of the baler of FIGS. 1 and 2 in conjunction with which the invention is utilized.

Referring now to FIG. 3 and in accordance with the present invention, a novel and surprisingly simple and in the nature of a transducer having a pair of relatively movable components is provided for monitoring the compressive force or load on the plunger arms 36 and hence the compressive load in the longitudinal or axial direction upon the hay in the bale chamber 20. As illustrated in FIG. 3, the plunger arm 36 comprises an elongate generally rectilinear tubular member. This tube or tubular member 36 includes a pair of similar end walls 40 and 42 and four elongate and similar rectangular side walls such as side wall 44 which define a generally rectangular cross-section of the tube or plunger arm 36. In accordance with the invention a suitable variable-frequency signal generator or oscillator 46 is provided for producing a signal which varies in frequency in accordance with the compressive force applied to the plunger arm 36 in the axial direction. The axial direction of the member 36 is defined between end walls 40 and 42.

In this regard, the signal generating means or oscillator circuit 46 may be mounted to the plunger arm itself or in any other suitable location. This oscillator circuit 46 is coupled to a variable element in the form of a coil of wire 48 which is provided with a relatively movable ferromagnetic core piece 50. In accordance with the illustrated embodiment, the coil of wire is substantially coaxially mounted within the tubular plunger arm 36 and preferably coupled to an inner surface of the end wall 42. The ferromagnetic core member 50 is coaxially mounted to extend at least partway into the coil 48 by an elongate support rod member 52, preferably of steel. This elongate rod 52 is preferably securely mounted to the opposite end wall surface 40, also coaxially with the tubular plunger arm 36. Hence, the rod member 52 defines means for mounting the ferromagnetic core coaxially within the tubular plunger arm for coaxial movement within the coil 48. Thus, the rod member 52 comprises one relatively movable component of the transducer-like sensor and the coil 48 comprises a second relatively movable component of the transducer-like sensor.

In accordance with a preferred form of the invention, a quantity of resilient material such as a foam rubber-like material 54 is provided to fill the interior volume of the plunger arm 36 intermediate the steel rod 52 and side walls 44 thereof to hold the rod in the substantially coaxial alignment just described.

From the foregoing it will be appreciated that the amount of compressive force applied to the plunger arm during compression of the charge in the baling chamber 20 will bear a given, though not necessarily linear, relationship with the amount of axial compression, that is, a reduction in axial length, of the rectangular tubular plunger arm 36. Stated alternatively, the plunger arm 36 may be generally viewed as a structural member to which a load force is applied. Hence, the reduction in length of a given dimension of the structural member in response to this load or force is measured by the apparatus of the invention. Still more generally, the invention provides means for measuring a change in the relative displacement or position between any two relatively movable points, for example coaxially aligned points in the end walls 40 and 42 of the tubular plunger arm 36. Hence, the relative position of the ferromagnetic core 50 with respect to the coil 48 will also vary or change by a corresponding, but again not necessarily linearly, related amount. Correspondingly, the frequency of the oscillatory or frequency-variable signal produced by the oscillator 46 of which the coil 48 is a part, will also vary by a corresponding, but again not necessarily linearly, related amount.

Figure 4:
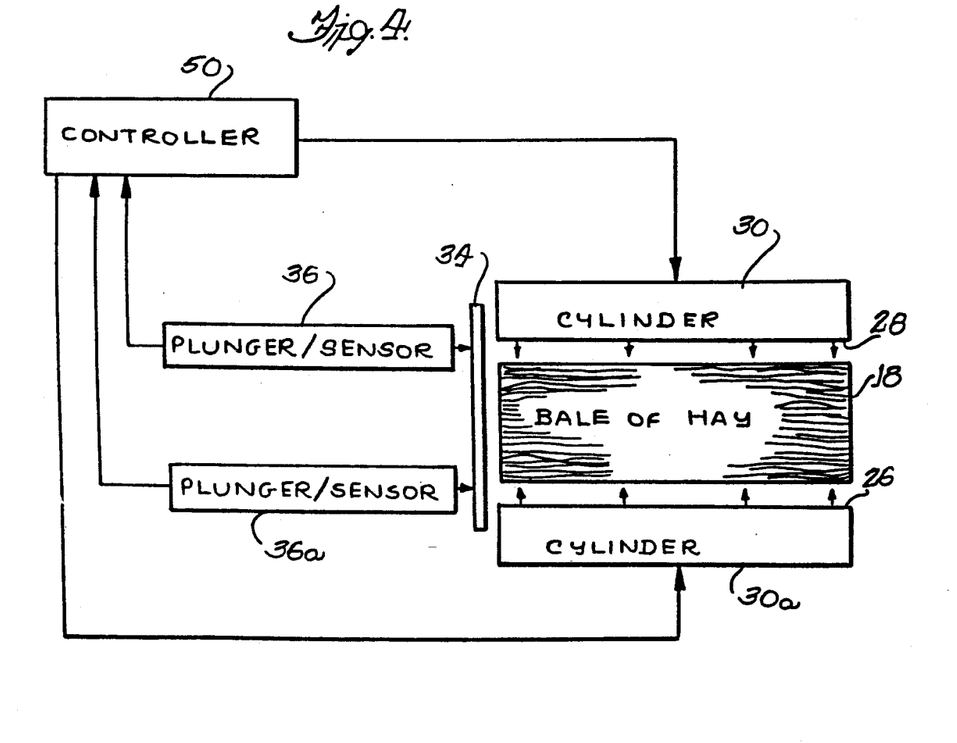
FIG. 4 is a diagrammatic view illustrating operation of the baling machine or baler in accordance with the invention.

Referring briefly to FIG. 4, as previously mentioned the sensor arrangement in accordance with the invention may advantageously be used with both of a pair of plunger arms 36, 36a, commonly employed in a baling machine such as the machine 10 of FIGS. 1 and 2. Advantageously, a suitable controller or control circuit, which forms no part of the present load sensor per se invention, here designated generally by reference numeral 50, may be utilized to control the flow of hydraulic fluid to the cylinders 30 which control the positioning of the sides 24, 26 of the baling chamber as previously described.

As just described, a number of non-linear relationships exist between the load or force applied to the plunger arm 36 and the frequency of the signal produced by the oscillator circuit 46. Advantageously, the present invention includes a novel measuring circuit means, illustrated in FIG. 5, responsive to the frequency-variable signal produced by the sensor arrangement of FIG. 3 for producing a load signal which corresponds to the compressive load on the plunger arm 36. Moreover, in accordance with the invention, this measuring circuit includes novel linearizing means responsive to a plurality of the frequency-variable signals developed in response to a corresponding plurality of known compressive forces applied to the plunger arm member 36 for producing a suitable linearizing control signal or signals to effectively linearize the response of the foregoing components for the particular plunger arm 36 with which they are associated. Hence, accurate and repeatable load calculations may then be made by calculating means of the novel measuring circuit of the invention based upon the frequency-variable signal developed in response to loads applied in operation and the linearizing control signals previously developed and stored.

Figure 5:
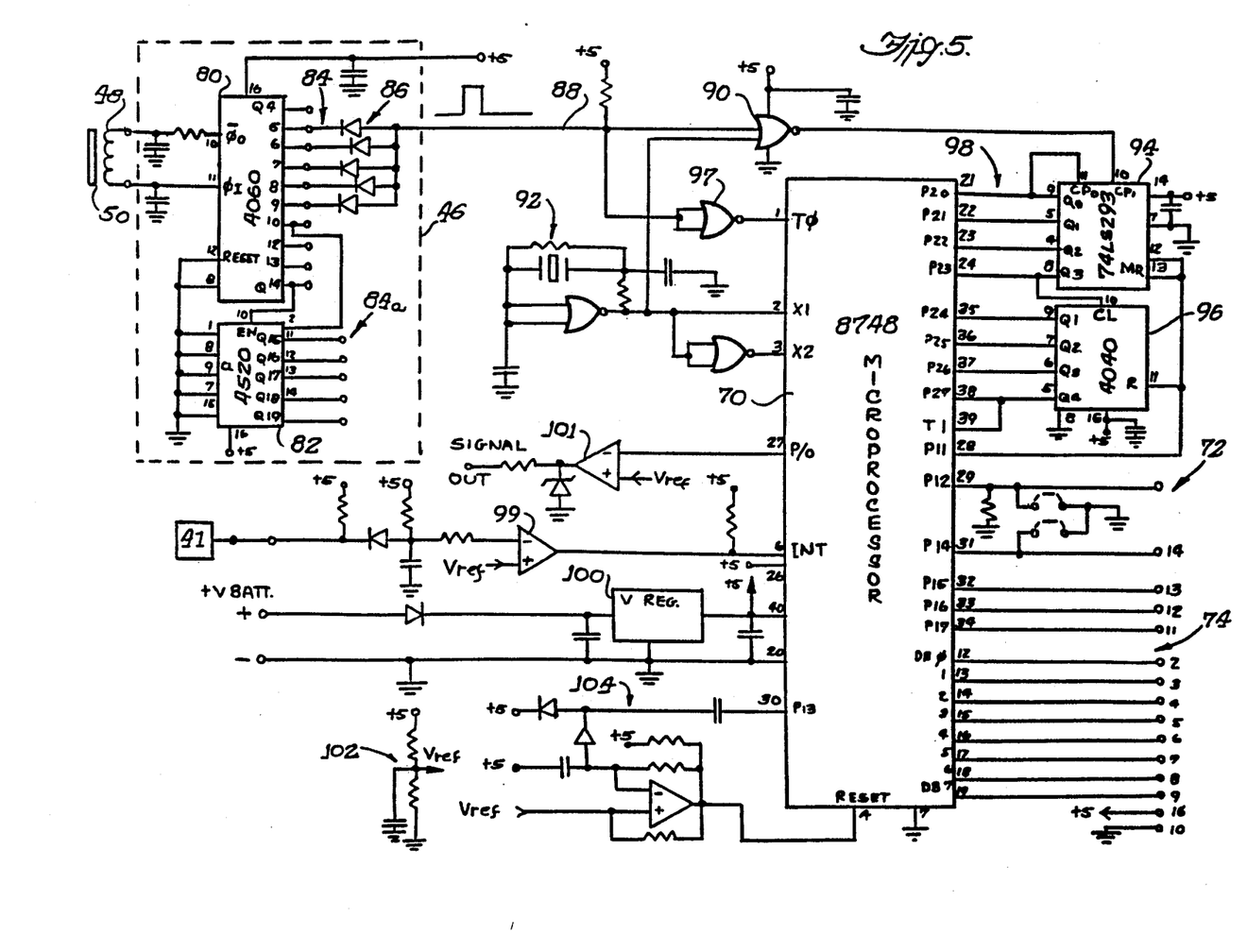
FIG. 5 is a schematic diagram illustrating a circuit in accordance with a preferred form of the invention.

Advantageously and referring now more particularly to FIG. 5, the foregoing operations may be simply and economically carried out by a suitable microprocessor or microcomputer circuit component designated generally by the reference numeral 70. In the illustrated embodiment a microcomputer of the type generally designated 8748 is utilized. This microprocessor or microcomputer includes one or more suitable programmable register means, in the form of programmable read only memory, for receiving and storing linearizing data or information developed in response to the frequency-variable signals produced in response to known compressive forces applied to the structural member or plunger arm 36. This linearizing data may then be utilized together with the oscillatory or frequency-variable signals developed in operation for producing accurate and repeatable calculations of the axial loads being applied to the plunger arm 36 during operation.

From the foregoing it will be seen that the novel monitoring arrangement in accordance with the invention is equally useful for determining relative displacement or movement between any two members to which the coil 48 and core 50 are coupled. Hence, the invention is not limited to the compressive load measurement of the illustrated embodiment but may be utilized in other applications as well. Advantageously, then, the invention facilitates and simplifies the accurate and repeatable measurement of essentially non-linear load or displacement information.

In operation, the linearizing operation may be simply and rapidly carried out with respect to each plunger arm or other relatively movable or displaceable member or members by the simple expedient of applying a plurality of known loads to effect different relative displacements or movements, and recording the resulting data. Hence, the recorded data may thereafter be utilized to accurately measure loads applied to displacements experienced during operation. In this regard, the microprocessor 70 may be suitably programmed to carry out the linearizing operation, or alternatively, another processor or computer may be utilized in conjunction with the microprocessor 70 to effect the linearizing operation.

To this end, the processor 70 is provided with a plurality of input/output (I/O) ports 72 and an 8-bit data bus 74 to communicate with a suitable computer (not shown) to effect the linearizing operation. In this regard, the use of a second computer permits the usage of a simpler and relatively cheaper microprocessor component 70, such as the microcomputer of the type 8748 previously described.

Referring more particularly to FIG. 5, suitable frequency-to-digital converting circuitry is coupled intermediate the coil 48 and the microcomputer or microprocessor 70 to convert the frequency or oscillatory signals developed into digital forms suitable for further processing by the microprocessor 70.

The frequency-to-digital converting circuitry includes a first pair of counters 80, 82, the coil 48 being coupled across suitable terminals of the first counter 80. Selected count outputs 84 of the counter 80 are then coupled by a plurality of diodes 86 to an input line or conductor 88. This conductor 88 feeds one input of a two-input NOR-gate 90 which receives its second input from a high frequency crystal oscillator circuit 92. The output of this NOR-gate 90 is fed to the count input of a second counter circuit which in the illustrated embodiment comprises a pair of sequentially or series-coupled integrated circuit counter components 94, and 96. The count outputs of these latter counters 94 and 96 feeds suitable I/O ports, designated generally 98, of the microprocessor 70.

In operation, the first counter component 80 comprises an integrated circuit component of the type generally designated CD 4060. In addition to a counter circuit, this component includes a buffer circuit coupled between terminals 10 and 11 thereof to form an oscillator circuit with the coil 48. These buffer components are then internally coupled with the counter circuit portion of integrated circuit 80 to provide a count output on terminals 84 thereof corresponding to the frequency of the oscillator thus formed. The additional counter component 82 is provided in sequence to form a "programmable" counter with the counter circuit of the integrated circuit component 80. This provides additional terminals 84a from which to select to "program" a suitable signal onto the line 88. In this regard, the duty cycle of the signal produced at line 88 may then be varied or scaled to bear a desired relationship to the frequency developed by the oscillator circuit portion 46.

This variable duty cycle signal in turn gates through a corresponding number of high frequency pulses from the high frequency oscillator circuit 92 at the gate 90. The succeeding counter circuit comprising counters 94 and 96 counts these gated through pulses to deliver a parallel format count to the microprocessor 70. Hence, the parallel count delivered on I/O ports 98 is scaled to bear a preselected relationship with the frequency developed at the oscillator 46, in accordance with the selection of outputs 84, 84a of the counters 80, 82. Accordingly, the programming of the microprocessor enables automatic determination of the frequency of oscillator 46 from the count received at ports 98.

In the illustrated embodiment the zero or low level of the variable duty cycle signal produced on line 88 is utilized to gate pulses through gate 90. The intervening logic high states of this signal are utilized to signal the microprocessor by way of a buffer 97 of the end of one cycle of gated high frequency pulses. Hence, the processor calculates the load based upon the number of counts received at ports 98 intermediate pulses delivered by the buffer 97.

The previously mentioned sensor 41 associated with the fingers 19 feeds a suitable interrupt (INT) port of the microprocessor 70 by way of an input circuit including an operation amplifier 99 which is provided with a reference level Vref to be described later. Similarly, the output control signal developed for the controller 50 is fed out to the terminal designated SIGNAL OUT by way of a similar operational amplifier 101 which is referenced against the same level Vref.

An additional conventional voltage supply including a suitable integrated circuit voltage regulator 100 provides a stable plus 5 volt DC supply for the microprocessor 70 and other circuit components thus far illustrated. This voltage supply is preferably coupled to a vehicle battery (TV BATT) for example, that of the tractor pulling the baler 10. Additionally, a suitable reference DC voltage level Vref is also provided from the regulated plus 5 volts by a suitable resistive voltage divider designated generally by reference numeral 102. This reference voltage and the plus 5 regulated DC volts are fed through a suitable power-up circuit 104 to inputs of the microprocessor for 70 by a power-up or initiating circuit 104 to initiate the microprocessor 70 in accordance with conventional practice In order to fully illustrate a specific embodiment of the invention, a suitable program or software listing for the microprocessor 70 is reproduced as the Microfiche Appendix to this specification, which Microfiche Appendix is available from the United States Patent and Trademark Office.

While the invention has been illustrated and described herein with reference to a specific embodiment, the invention is not limited thereto. Those skilled in the art may devise various changes, alternatives and modifications upon reading the foregoing description. The invention includes such changes, alternatives and modifications insofar as they fall within the scope of the appended claims.

The invention is claimed as follows:

1. In apparatus for applying an adjustable force to a material, the improvement comprising:
   an assembly including an element which undergoes compressive loading during the application of force to the material;
   adjustable input power means for supplying force to the material; and
   means for adjusting the input power means, including
   electrical circuit means comprising transducer means having a pair of relatively movable components operable, upon relative movement therebetween, for changing an electrical parameter experienced by said circuit means;
   means operably coupling one of said components with said element for movement of the coupled component in response to compressive loading on said element; and
   control means operably connected with said input power means and said circuit means for detecting said electrical parameter change, and for adjusting said input power means in response to said electrical parameter change, in order to thereby adjust the force applied to said material.

2. In apparatus as set forth in claim 1, said element comprising an elongated, tubular metallic arm.

3. In apparatus as set forth in claim 1, said circuit means including oscillator means for generating an alternating current, said relatively movable components of the transducer means being operable, upon relative movement therebetween, to change the frequency of said alternating current experienced by said circuit means.

4. In apparatus as set forth in claim 3, wherein said components comprise an electromagnetic coil and a ferromagnetic core disposed at least partially within said coil.

5. In apparatus as set forth in claim 4, said element comprising an elongated, tubular arm having a pair of opposed ends, said coil being secured to one of said ends, said core being supported by the other of said ends.

6. In apparatus as set forth in claim 1, said control means being operable to generate an output signal which is linearally proportional to said compressive force.

7. In apparatus as set forth in claim 1, said assembly including portions of a crop baler which cooperate to produce a compacted bale of crop material, said input power means including a crop-engaging plunger, said element comprising an elongated plunger arm operably coupled with said plunger.

8. In apparatus as set forth in claim 7, said cooperating baler portions including a pair of relatively spaced jaws defining a discharge opening therebetween, said jaws being mounted for relative shifting movement toward and away from one another to adjust the cross-sectional dimensions of said discharge opening, said input power means further including shifting means coupled with said jaws for effecting said adjusting movement thereof, said control means being connected with said shifting means of the jaws for adjusting the forces applied to said jaws in response to said electrical parameter change.

9. In apparatus as set forth in claim 8, said shifting means comprising a hydraulic piston and cylinder assembly.

10. In a baler:
a pair of relatively spaced jaws defining a restricted discharge opening therebetween through which compacted crop bales may be discharged from the baler,
said jaws being mounted for relative adjusting movement toward and away from one another to adjust the cross-sectional dimensions of said discharge opening;
power means operably coupled with said jaws for effecting said adjusting movement thereof;
a plunger reciprocable toward and away from said discharge opening for compacting and incrementally advancing successive charges of crop materials toward said opening during each compaction stroke of the plunger, whereby to form a bale whose density is determined at least in part by the resistance to advancement of the bale caused by the restricted discharge opening,
said plunger having a structural member associated therewith subject to compressive loading during a compaction stroke of the plunger; and
means operably coupled with said power means and responsive to the extent of compressive loading in said structural member for causing adjustment of said jaws.

11. The baler as set forth in claim 10, said adjustment-causing means comprising:

electrical circuit means including transducer means having a pair of relatively movable components operable, upon relative movement therebetween, for changing an electrical parameter experienced by said circuit means; and
means operably coupling one of said components and said structural member for movement of the coupled component in response to compression of said structural member; and
means operably connecting said power means and said circuit means for detecting said electrical parameter change, and for adjusting said jaws in response to said electrical parameter change.

12. The baler as set forth in claim 11, said structural member comprising an elongated, tubular metallic arm.

13. The baler as set forth in claim 11, said circuit means including oscillator means for generating an alternating current, said components of the transducer means being operable, upon relative movement therebetween, to change the frequency of said alternating current experienced by said circuit means.

14. The baler as set forth in claim 13, wherein said components comprise an electromagnetic coil and a ferromagnetic core disposed at least partially within said coil.

15. The baler as set forth in claim 14, said structural member comprising an elongated, tubular arm having a pair of opposed ends, said coil being secured to one of said ends, said core being supported by the other of said ends.

16. The baler as set forth in claim 11, said detecting and adjusting means comprising circuit structure for generating an output signal which is linearally proportional to said compressive loading in said member, there being means operably coupling said output signal-generating circuit structure to said power means.

17. Apparatus for controlling the density of bales of crop material discharged from an agricultural baling machine, said apparatus comprising:
a bale case into which crop material is introduced;
means for providing resistance to the movement of crop material through said bale case;
a plunger element disposed for reciprocating movement in said bale case;
means for reciprocably driving said plunger element in a manner whereby said plunger element applies a compactive force to crop material introduced into said bale case and thereby facilitates movement of said crop material through said bale case;
means for connecting said plunge element to said plunger driving means;
means for sensing the stress experienced by said connecting means during the application of said compactive force applied by said plunger element and for producing an electrical signal in accordance with said sensed stress; and,
means for adjusting in response to said electrical signal the degree of resistance to said crop material movement through said bale case.

18. The apparatus of claim 17, wherein said connecting means has a first end connected to said plunger drive means and a second end connected to said plunger element, and wherein said sensing means is positioned proximate one of said ends of said connecting means.

19. A method for controlling the density of bales of crop material discharged from an agricultural baling machine, said method comprising the steps of:
introducing crop material into a bale case;

reciprocably driving a plunger element disposed in said bale case in a manner whereby said plunger element applies a compactive force to crop material introduced into said bale case, said plunge element being connected to plunger driving means by connecting means;

sensing the stress experienced by connecting means during the application of said compactive force applied by said plunger means for producing an electrical signal in accordance with said sensed stress; and, adjusting in response to said signal the degree of resistance to the movement of crop material through said bale case and thereby controlling the density of bales of crop material being discharged therefrom.

20. A method for controlling the degree of stress experienced by connecting means which connects a plunger element to plunger drive means of an agricultural baling machine, said method comprising the steps of:

introducing crop material into a bale case comprising said machine;

reciprocably driving said plunger element disposed in said bale case in a manner whereby said plunger element applies a compactive force to crop material introduced into said bale case, said plunger element being connected to plunger driving means by said connecting means;

sensing the stress experienced by connecting means during the application of said compactive force applied by said plunger means and for producing an electrical signal in accordance with said sensed stress; and adjusting in response to said signal the degree of resistance to the movement of crop material through said bale case and thereby controlling the degree of stress experienced by said connecting means.

* * * * *

UNITED STATES PATENT AND TRADEMARK OFFICE
CERTIFICATE OF CORRECTION

PATENT NO. : 5,253,570

DATED : October 19, 1993

INVENTOR(S) : Goeckner

It is certified that error appears in the above-indentified patent and that said Letters Patent is hereby corrected as shown below:

The title page, should be deleted and substitute therefor the attached title page.

Signed and Sealed this

Fourteenth Day of June, 1994

Attest:

BRUCE LEHMAN

Attesting Officer

Commissioner of Patents and Trademarks

United States Patent [19]

Goeckner

[11] Patent Number: 5,253,570
[45] Date of Patent: Oct. 19, 1993

[54] BALER WITH LOAD SENSOR

[75] Inventors: Victor D. Goeckner, Virden, Ill., and Thomas G. Schrag, Hesston, Kans.

[73] Assignee: Hay & Forage Industries, Hesston, Kans.

[21] Appl. No.: 859,235

[22] Filed: May 5, 1986

Related U.S. Application Data

[63] Continuation of Ser. No. 537,732, Sep. 30, 1983, abandoned.

[51] Int. Cl.⁵ .......................... B30B 15/26; B30B 9/30
[52] U.S. Cl. .......................... 100/41; 100/43; 100/191
[58] Field of Search .......................... 100/41, 43, 191; 364/550

[56] References Cited

U.S. PATENT DOCUMENTS

| | | | |
|---|---|---|---|
| 3,212,434 | 10/1965 | Raab | 100/192 |
| 3,700,865 | 10/1972 | Ley | 364/573 |
| 3,790,910 | 2/1974 | McCormack | 364/573 |
| 3,939,459 | 2/1976 | Hoopes | 364/573 |
| 4,149,120 | 4/1979 | Richter | 364/573 |
| 4,166,414 | 9/1979 | Fleming et al. | 100/43 |
| 4,280,403 | 7/1981 | Alderson | 100/43 |
| 4,282,578 | 8/1981 | Payne et al. | 364/573 |
| 4,349,886 | 9/1982 | Ibar | 364/573 |
| 4,395,711 | 7/1983 | Ward | 364/208 |
| 4,403,296 | 9/1983 | Prosky | 364/573 |
| 4,502,006 | 2/1985 | Goodwin et al. | 324/233 |

OTHER PUBLICATIONS

Hesston, "Big Bale System", Hesston Corporation, Hesston, Kansas, 1978.

Primary Examiner—Andrew M. Falik
Attorney, Agent, or Firm—Hovey, Williams, Timmons & Collins

[57] ABSTRACT

In a rectangular baler provided with a reciprocating plunger that compacts each new charge of crop materials against previously compacted material and incrementally advances the compacted charge toward a restricted discharge opening at the rear of the baler, the compressive load in the connecting rods of the plunger is sensed during each compaction stroke and is compared with a preselected value to determine whether the size of the discharge opening should be increased or decreased in order to maintain the selected load value. A sensor in each of the connecting rods is in the nature of a transducer that causes a change in the frequency of an output signal in accordance with the compressive loading in the connecting rod, such output signal being delivered to a controller which in turn regulates the operation of hydraulic mechanism to increase or decrease the size of the discharge opening.

20 Claims, 3 Drawing Sheets